May 22, 1956 C. A. VAN PAPPELENDAM 2,747,064
APPARATUS FOR MAKING CORRUCATED CORE STRUCTURAL SHEET MATERIAL
Filed Aug. 22, 1952 3 Sheets-Sheet 2

*INVENTOR.*
CARL A. VAN PAPPELENDAM
BY
*William R. Lane*
ATTORNEY

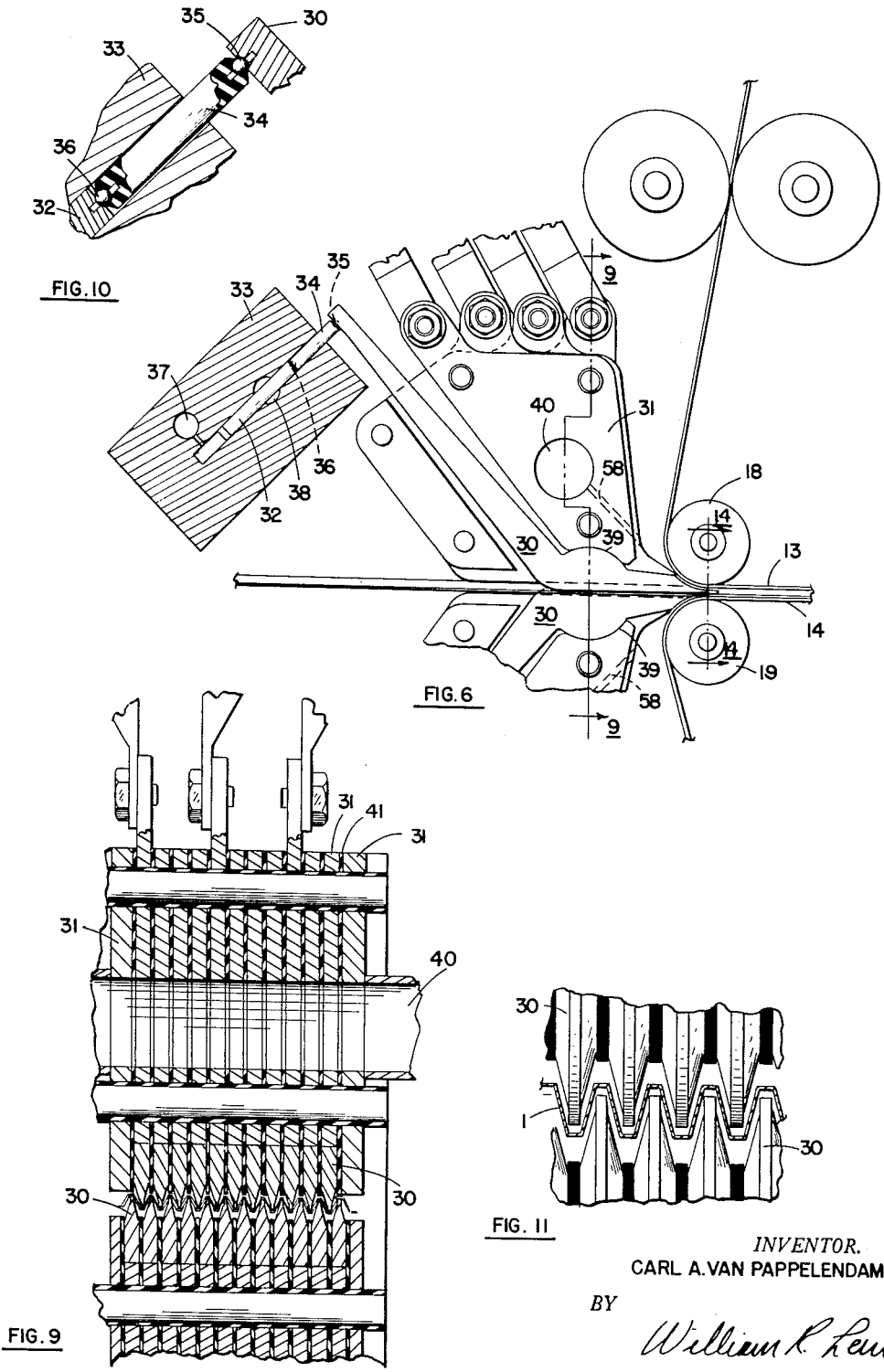

United States Patent Office 2,747,064
Patented May 22, 1956

2,747,064

APPARATUS FOR MAKING CORRUGATED CORE STRUCTURAL SHEET MATERIAL

Carl A. van Pappelendam, Rivera, Calif., assignor to North American Aviation, Inc.

Application August 22, 1952, Serial No. 305,788

8 Claims. (Cl. 219—4)

This invention relates to an improved sandwich-type structural material, and particularly to means for making said material economically in quantity.

Recent progress in materials research has made available many very high-strength, structural materials. Among these materials are stainless steel, aluminum and magnesium alloys, and plastics of various types. These materials find substantial utility in the construction of aircraft, prefabricated housing, and structures of all types where the strength-to-weight ratio of the material used is required to be high.

One of the classic difficulties associated with the use of any improved material of increased structural properties, however, has been that while when a structural specimen is subjected to tensile stresses the full physical properties of the material are usually developed, when the material is subjected to shear or compressive stresses, the specimen fails—not by failure of the material itself, but by instability of the form in which the material is fabricated. In the past, flat panels have been re-inforced by attachment thereto of ribs, longerons, stringers, or other structural elements, such as corrugated sheet, integrally attached to the sheet material to prevent instability failure under shear or compressive loading. However, with high-density materials, such as stainless steel, the number of stiffening elements required becomes prohibitively large from the construction standpoint, since the increased strength of the material permits use of thinner sheet sections, and thinner sheet sections, in turn, require more stiffening. While it has been long conseidered ideal to construct a section consisting of a central core of corrugated material covered on both surfaces with a flat sheet of the same or different material, no practical method has thus far been devised for making such composite sheet economically in quantity.

This invention contemplates means for efficiently joining two layers of flat sheet material to a corrugated core of the same or a different material.

This invention further contemplates the improvement of the basic section by the addition of beads in the corrugated material disposed transversely of the direction of corrugation in order to prevent local instability failure of the core material.

Finally, this invention contemplates the provision of a machine for efficiently fabricating the material hereinbefore referred to on a continuous basis and with minimum fabrication cost.

It is therefore an object of this invention to provide an improved sandwich-type structural configuration.

It is another object of this invention to provide an improved method for making continuously structural material composed of flat facing sheets joined to a corrugated core.

It is another object of this invention to provide a machine for beading, corrugating, forming, and joining corrugated core sandwich material.

Other objects of the invention will become apparent from the following description taken in connection with the accompanying drawings, in which Fig. 1 is a schematic drawing of the invention showing the various operations contemplated;

Fig. 6 is a detailed view of a form of the welding arrangement of this invention;

Fig. 7 is a fragmentary view of the end product of the invention;

Fig. 9 is an enlarged sectional view taken at 9—9 in Fig. 6;

Fig. 10 is an enlarged fragmentary detail of the device shown in Fig. 6;

Fig. 11 is an enlarged fragmentary detail of the device shown in Fig. 9;

Fig. 12 is an enlarged fragmentary detail of the device shown in Fig. 1;

Fig. 13 is a sectional view of the device shown in Fig. 12 taken at 13—13 in Fig. 12; and Fig. 14 is a sectional view of the device shown in Fig. 6 taken at 14—14 in Fig. 6.

Figure 1:
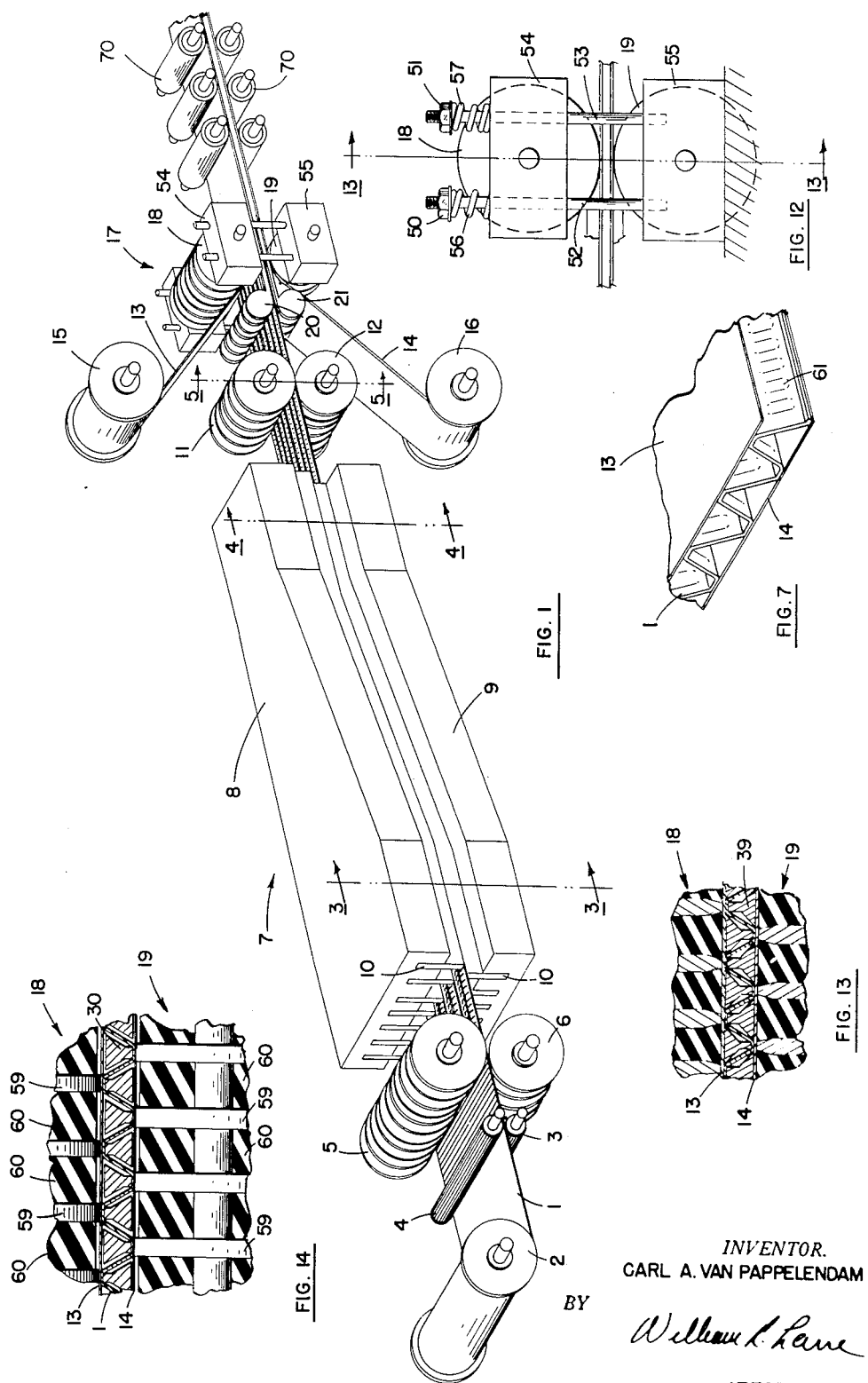
Figure 5:
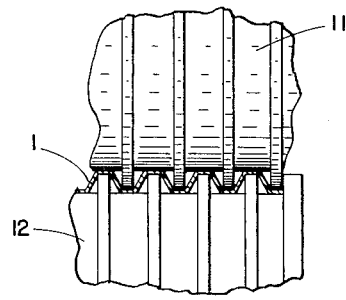
Fig. 5 is a sectional view of the device taken at 5—5 in Fig. 1.
Figure 3:
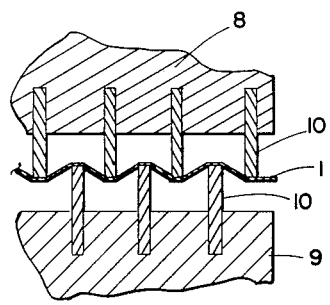
Fig. 3 is a sectional view of the device shown in Fig. 1 taken at 3—3 in Fig. 1.
Figure 4:
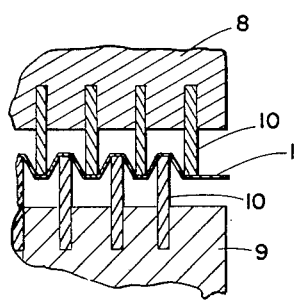
Fig. 4 is a sectional view of the device shown in Fig. 1 taken at 4—4 in Fig. 1.

Referring to the drawings, and particularly to Fig. 1, sheet material 1 of stainless steel or other weldable material which is to form the central corrugated portion of the sandwich is fed from roller 2 through transverse corrugating rollers 3 and 4 which impart to the sheet a relatively fine transverse corrugation. The sheet thus corrugated is then fed through ironing rollers 5 and 6 which serve to "erase" or crease the fine corrugations along parallel paths oriented in the direction of motion of the sheet material. Sheet 1 is then fed to longitudinal corrugator 7, the purpose of which is to fold the sheet material into V-shaped corrugations parallel to the direction of motion of the sheet. Corrugator 7 is comprised of upper and lower base blocks 8 and 9 in which are embedded guide members 10 arranged as indicated in Figs. 3 and 4 so that at the input to the corrugator, guide members 10 are spaced exactly to follow the paths left by ironing rollers 5 and 6; and at the output of the corrugator the guides are spaced somewhat closer together and overlap each other to accomplish the depth of corrugation required. From corrugator 7 the sheet is fed to sizing rollers 11 and 12 which serve to flatten the peaks and valleys of the corrugations to give more precise dimensions thereto and ready the corrugated sheet for welding to facing sheets 13 and 14 of stainless steel or other weldable material fed from rollers 15 and 16. Details of sizing rollers 11 and 12 are shown in Fig. 5. The three sheets are joined by continuous welder 17 which incorporates welding rollers 18 and 19 and upper and lower welding electrodes 20 and 21. After joining, the sheet sandwich appears as indicated in Fig. 7, with tiny beads 61 running transversely of the leg of the corrugation, and the peaks and valleys of the corrugation welded to the facing sheets. The welded assemblage is drawn through the machine by power-driven rollers 70 so that the welding rollers may be held stationary and need not rotate or may be power-driven to assist rollers 70.

Figure 2:
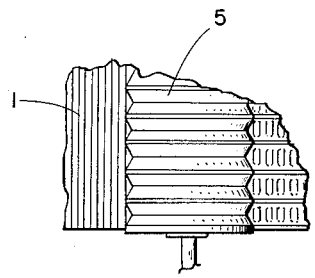
Fig. 2 is a detailed drawing of the beading corrugator of this invention.
Figure 8:
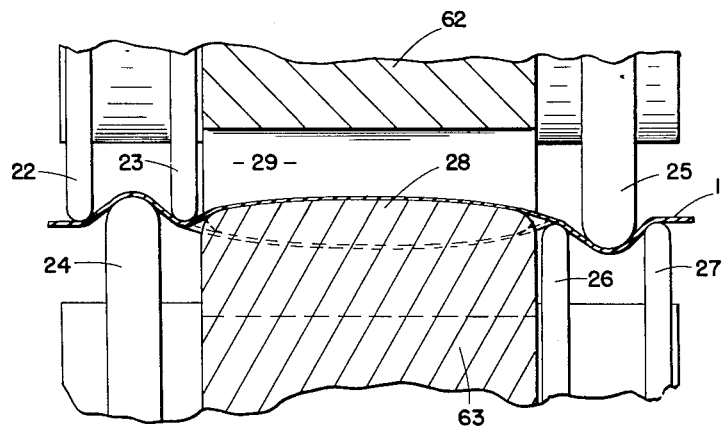
Fig. 8 is a sectional view of a modified form of a beading roller for use in connection with the invention.

The initial transverse corrugations may be formed either as shown in Figs. 1 and 2, or as shown in Fig. 8. In Fig. 8, the steps of transverse corrugation and ironing are performed simultaneously by a pair of toothed rollers 62 and 63, fragments of which are shown in Fig. 8. Cylindrical rollers 22, 23, 24, 25, 26, and 27 are arranged to impart to the sheet the beginning of folds which ultimately form small continuous peaks and valleys in the material oriented parallel to the direction of motion of the sheet. Intermediate to these sets of rollers and also forming integral parts of rollers 62 and 63 are meshing gears 28 and 29 having teeth which are rounded off at their ends which form tiny beads between adjacent peaks and valleys of the corrugation. The paths left by the rollers accommodate the folding guides previously discussed, and facilitate the formation of the corrugated section. The embodiment of the device shown in Fig. 8 is best adapted for use with thin stainless steel, while that of Fig. 1 functions better with thicker sheet such as aluminum, magnesium, or plastic.

The welding arrangement shown in Fig. 1 is designed upon the assumption that sufficiently uniform welding may be accomplished by adjusting the pressure between the welding rollers by means disclosed in detail in Fig. 12. Accordingly, the welding electrodes are held fixed in the position shown by a bracket (not shown) or by any convenient means, and adjustment of welding pressure is effected by loosening or tightening adjustment nuts 50 and 51 which are threaded on bolts 52 and 53 and hold bearing blocks 54 and 55 together by means of compression springs 56 and 57. A similar arrangement (not shown) is employed at the other end of the welding rollers to effect a corresponding adjustment.

The arrangement of the invention shown in Figs. 6, 9, 10, 11, and 14 may be used for thin sheet where slight misalignment of the welding rollers or variations in thickness of the sheet may affect the quality of the weld, and provides for uniform welding pressure to be applied hydraulically by each individual welding electrode. In Fig. 6 are shown welding rollers 18 and 19 with facing sheets 13 and 14 being fed around them on a rather sharp radius. These rollers, as appears from Fig. 14, are built up of alternate conducting discs 59 and insulating discs 60. Between the rollers and lying in valleys in corrugated sheet 1 are welding electrodes 30 pivotally supported by brackets 31, each bearing against an opposing conducting disc 59 on one of rollers 18 or 19. The tip of each welding electrode 30 is held in contact with the sheet material by hydraulic pressure applied by means of piston 32 in cylinder block 33. Piston 32 is connected to the welding electrode by a connecting rod 34 made of micarta or some other suitable insulating material which insulates the hydraulic system from the electrical current-carrying welding electrode. Pivot balls 35 and 36 shown in detail in Fig. 10 afford the requisite angular freedom for variations in sheet thickness. It is to be noted that the line of action of friction forces on the electrode produced by the sheet material passes through the effective center of the pivot so that variations in friction against the sheet do not cause corresponding variations in welding pressure. In Fig. 6, hydraulic pressure is applied through conduit 37 and acts on piston 32. Leakage from piston 32 is drawn off through port 38. Electrical connections for welding are made to bracket 31 which is in intimate contact with the electrode along pivot area 39. Brackets such as bracket 31 may be stacked one against another and insulated from each other as shown in Fig. 9. Because of the heat generated by the welding operation it is necessary to cool the welding electrodes and brackets to keep the electrodes from overheating and obtain consistent welding. Consequently, cooling water is circulated through conduit 40 in the welding electrode brackets and is sprayed upon the ends of the welding electrodes through ducts 58. Welding current is applied by any well known means to each electrode and opposing roller disc, and welds are effected between corrugated sheet 1 and facing sheets 13 and 14.

While Fig. 6 shows but a single pair of welding electrodes, it is to be understood that for each seam weld made, another electrode is required, with alternate electrodes being loaded to maintain pressure against alternate welding rollers. In other words, one electrode maintains pressure against welding roller 19 while the next welding electrode maintains pressure against welding roller 18. Thus, the invention provides for the simultaneous formation of a multitude of seam welds or closely spaced spot welds along the peaks and valleys of the corrugations attaching the facing sheets to the corrugated material. A variety of controls for the electrical circuits furnishing the welding current necessary may be utilized, among them, electronic controls resulting in periodic pulses of precisely correct welding current as the sheet material is fed through the machine.

The finished material as shown in Fig. 7 is characterized by a relatively high radius of gyration in comparison to the weight of material used. Because the width of the corrugation is made small, the unsupported length of facing sheet material is short, relative to its thickness, and a high compressive strength of the facing sheet material can be developed before instability failure occurs. Likewise, local instability failure of the corrugations is substantially prevented by the presence of the tiny beads which run transversely of the corrugated material. From Fig. 7, the resemblance of the cross-section of the material to a truss is apparent. The efficiency of the material for carrying shear load applied in a direction normal to the plane of the material is obvious because each leg of the corrugation acts in a manner similar to a truss member, the transverse beads serving to eliminate local instability failure.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An improved method of making corrugated core sandwich-type weldable metallic structural sheet material comprising feeding flat sheet material continuously from a roll thereof, simultaneously scoring said material along uniformly spaced paths parallel to the direction of motion of said material and forming beads between said paths, folding said material into a corrugated section by bending along said paths, feeding flat sheet material from two rolls thereof into contact with said corrugated material on either side thereof, and continuously passing welding current through said flat sheet material and adjacent apexes of said corrugated material to thereby form a sandwich consisting of said corrugated material as a core and said flat sheet material as facing sheets.

2. Apparatus for making corrugated core sandwich structural material including a corrugated core and a flat facing sheet integrally attached to each side of said core comprising a cylindrical roller for holding a roll of sheet material, means for feeding said sheet material from said roll, means for continuously corrugating said sheet material with corrugations running parallel to the direction of motion of said material, a pair of cylindrical welding rollers separated by a distance approximately equal to the thickness of said sheet material after corrugation, a pair of rollers carrying rolls of sheet facing material, means for feeding said facing sheets continuously into contact with said corrugated material on either side thereof, slender welding electrodes extending into said corrugations adjacent the initial contact of said facing sheets with said corrugated material, and means for applying welding current between each said electrode and an opposing welding roller to thereby weld said facing sheets to said core material.

3. In a machine for continuously making corrugated core sandwich structural material, means for welding said core material to flat facing sheets on both sides of said core comprising a pair of welding rollers arranged with parallel axes of rotation and separated by a distance approximately equaling the thickness of said sandwich material, means for pulling said sandwich material through the space between said rollers, means for bringing said facing sheets into contact with said corrugated core material immediately adjacent said rollers, welding electrodes lying in the valleys of said corrugated material, and means for pressing each said welding electrode toward an opposing roller while a welding current is applied between each said electrode and an opposing roller to thereby effect the simultaneous attachment of each said facing sheet to said corrugated core material.

4. Means for attaching flat facing sheets of weldable structural material to a corrugated core sheet of structural weldable material comprising a pair of parallel rotatable rollers separated by a distance equal to the combined thickness of said corrugated sheet and said facing sheets, means for feeding said sheets between said rollers with said flat sheet on either side of said corrugated sheet and with said corrugations oriented normal to the axes of said rollers, means for pressing each valley of said corrugated sheet toward one of said facing sheets as they pass between said rollers, and means including slender internal welding electrodes extending between said corrugations and external rollers for welding said sheets together while being pressed together.

5. Apparatus for making corrugated core sandwich structural material including a corrugated core and a flat facing sheet integrally attached to each side of said core comprising a cylindrical roller for holding a roll of sheet material, means for feeding said sheet material from said roll, means for continuously corrugating said sheet material with corrugations running parallel to the direction of motion of said material and beads running transverse to said corrugations between valleys of said material thus corrugated, a pair of parallel cylindrical welding rollers separated by a distance approximately equal to the thickness of said sheet material after corrugation, a pair of rollers carrying rolls of sheet facing material, means for feeding said facing sheets continuously into contact with said corrugated material on either side thereof immediately adjacent said rollers, slender welding electrodes fitted in said corrugations at said contact, means for urging each of said electrodes toward an opposing roller and against a valley of said corrugated material and one of said facing sheets, and means for applying welding current between each said electrode and an opposing welding roller to thereby weld said facing sheets to said core material.

6. A device as recited in claim 5 in which said urging means comprises a hydraulic cylinder connected to apply force to each said electrode whereby equal welding pressure may be maintained by each said electrode.

7. Means for continuously attaching flat facing sheets of weldable material to a corrugated core sheet of weldable material comprising a pair of conducting welding rollers separated by a distance equal to the combined thickness of said facing sheets and said corrugated sheet and oriented with axes of rotation parallel, means for feeding said facing sheets and said corrugated sheet between said rollers with said corrugations oriented parallel to the direction of motion of said sheet, and fixed welding means, including welding electrodes, cooperating to press said sheets against said rollers while welding current is passed therethrough and fitted within said corrugations, for joining said sheets as they are fed through said rollers.

8. Means for continuously attaching flat facing sheets of stainless steel to a corrugated core sheet of stainless steel comprising a pair of welding members having parallel conducting strips separated by insulating strips, said members separated by a distance equal to the combined thickness of said sheets and arranged in parallel with the insulating strips of one member opposite the conducting strips of the other member, means for bringing said facing sheets into contact with either side of said corrugated core sheet upon a sharp radius immediately adjacent said welding members with the corrugations of said corrugated sheet parallel to the direction of motion thereof, slender welding electrodes fitted into said corrugations between said welding members, and means for urging each of said electrodes toward a conducting strip on one of said welding members to apply predetermined pressure to a thickness of said corrugated core sheet and one of said facing sheets whereby if an electric current is caused to flow between said electrodes and said welding members as said sheets are fed between said members, said facing sheets are continuously attached to said core sheet.

References Cited in the file of this patent

UNITED STATES PATENTS

| | | |
|---|---|---|
| 1,624,029 | Whitcomb | Apr. 12, 1927 |
| 1,734,932 | Weed | Nov. 5, 1929 |
| 1,850,454 | Gross | Mar. 22, 1932 |
| 1,990,738 | La Porte | Feb. 12, 1935 |
| 2,056,563 | Budd et al. | Oct. 6, 1936 |
| 2,288,184 | Dodson et al. | June 30, 1942 |
| 2,299,776 | Weightman | Oct. 27, 1942 |
| 2,363,972 | Kellogg | Nov. 28, 1944 |
| 2,385,043 | Vang | Sept. 18, 1945 |
| 2,406,051 | Weiss | Aug. 20, 1946 |
| 2,423,870 | Blessing | July 15, 1947 |